Dec. 14, 1937.  F. C. MORTON  2,102,375
FASTENING MEANS FOR BEARING SLEEVES
Filed Feb. 26, 1937
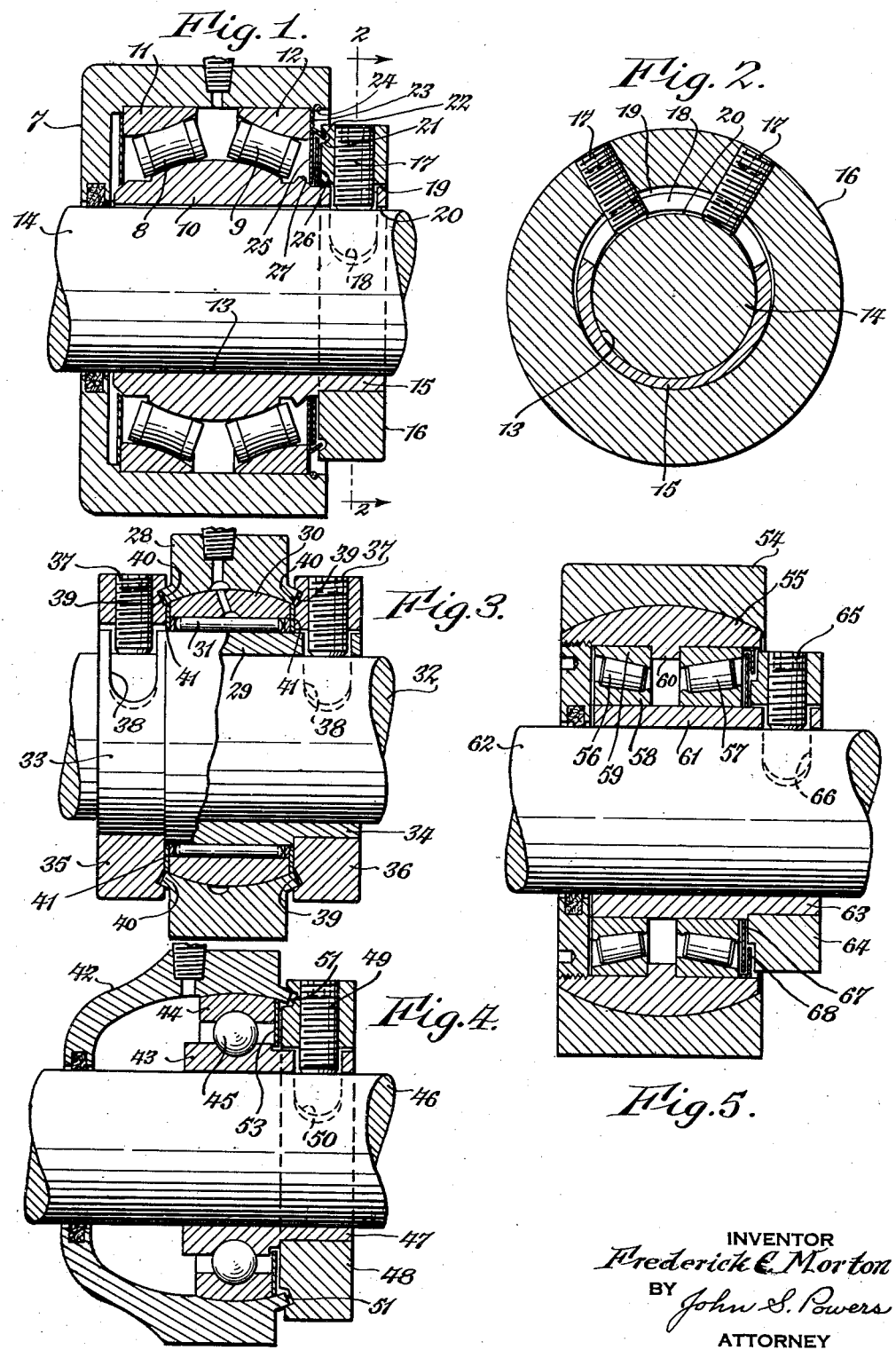
INVENTOR
Frederick C. Morton
BY John S. Powers
ATTORNEY Patented Dec. 14, 1937

2,102,375

UNITED STATES PATENT OFFICE 2,102,375

FASTENING MEANS FOR BEARING SLEEVES

Frederick C. Morton, Eggertsville, N. Y.

Application February 26, 1937, Serial No. 127,951

12 Claims. (Cl. 308—236)

This invention relates to improvements in bearings of the kind having a sleeve-like member which is adapted to fit upon, and rotate with, the shaft with which the bearing is associated and more particularly the invention is concerned with a bearing wherein provision is made for preventing relative movement between the said member and the shaft.

One object of the invention is to provide a bearing of the kind generally described in which the sleeve-like member is secured to the shaft in such a manner as to prevent relative rocking movements between the said parts.

A further object is to provide a bearing which is so designed that accurate or close fitting of the parts in order to insure their functioning in the proper manner is unnecessary.

A still further object is a bearing in which provision is made for preventing wearing of or injury to the shaft.

A still further object is to provide a novel design and arrangement of the parts of the bearing, whereby simplicity and compactness in construction are obtained, effective sealing of the housing in which the parts are mounted is insured, provision is made for end thrust, and complete assembly of all the parts before the application to the shaft is enabled.

Embodiments of the invention are illustrated in the accompanying drawing in which:

Figure 1 is a section through an anti-friction bearing in which the features of the invention are incorporated.

Figure 2 is a section taken along line 2—2 of Figure 1.

Figures 3, 4 and 5 are views similar to Figure 1 and illustrate the features of the invention in connection with various other types of anti-friction bearings.

The bearing, as illustrated in Figure 1, includes a housing 7 such as a pillow block, flange, cartridge or hanger box. Two sets of rollers are indicated at 8 and 9. The races for the said rollers are provided by an inner sleeve-like member 10 and outer co-operating rings 11 and 12, the member 10 having a bore 13 and fitting upon the shaft 14 with which the bearing is associated.

In accordance with the invention the member 10 is formed to provide a hub 15, the outer face of which is annular but eccentric with the bore 13. A collar 16 is mounted upon the said hub and is attached thereto by set screws 17 which extend through an elongated slot 18 which is formed in the hub 15, the said set screws being of a diameter substantially equal to the width of the slot 18. The slot 18 is located at the thick side of the hub and is formed circumferentially of the hub while the set screws 17 are arranged in spaced relation with respect to the ends of the said slot as best shown in Figure 2. When the set screws are tightened against the shaft 14 they cause the opposite sides of the collar 16 and shaft 14 to engage tightly the thin side of the hub 15 thereby forming clearances 19 and 20 between the thicker side of the hub 15 and the adjacent portions of the shaft 14 and collar 16 in the event that the said parts do not fit closely, it being understood that the clearances shown are exaggerated for the sake of clarity. It will be apparent that if the member 10 starts to creep during rotation of the shaft 14 a thicker portion of the hub 15 will be caused to move between those portions of the shaft and collar which have been adjusted to engage the thin side of the said hub. The member 10 and shaft 14 will, therefore, be locked against relative angular movement. The greater the force which causes the member to creep and the greater the angular distance through which it moves the tighter the hub is wedged against the said shaft. The hub 15 and collar 16 are of substantial widths. Hence they are operative to hold the member 10 for its full length against the shaft. Rocking of the said member or shaft relatively to one another is, therefore, prevented. The construction described has the further advantage that excess wearing of or injury to the shaft at local areas is prevented. Further the securement of the member 10 to the shaft in the manner described makes provision for end thrust without the necessity of employing additional collars or shoulders for this purpose.

The invention contemplates the use of the collar 16 in connection with the sealing of the open end of the housing 7 in order to prevent the escape of the lubricating medium and the entry of dust and other foreign substances. To this end the inner face of the said collar is formed with an annular groove 21. The outer wall of the said groove has a conforming fit with the outer face of an annular flange 22 which is formed or provided upon a ring 23. The latter fits in the end of the housing over the inner member 10 and against the outer race member 12, being removably secured in such position by an element 24. Discs 25 and 26 provide a secondary seal, the former being secured against the race member 12 by the flange 22 and co-operating with a shoulder 27 which is formed upon the member 10. The disc 26 is mounted upon the member 10 in spaced relation with respect to the disc 25 and the inner face of the collar 16, whereby to provide a seal of the labyrinth type. It is to be noted that the sealing faces of the groove 21, the flange 22 and the shoulder 27 are portions of spheres and have the same center as that about which the shaft 14 is adjustable as it aligns itself. The discs 25 and 26 and the collar 16, therefore, co-operate to seal the open end of the housing 7 while permitting the bearing parts to move to accommodate themselves to the alignment of the shaft.

In the embodiment of the invention illustrated in Figure 3, the housing is indicated at 28. Inner and outer race members are indicated at 29 and 30, respectively, the bearing elements 31 being of the "needle" type. The member 29 fits upon a shaft 32 and extends beyond the opposite sides of the housing to provide hubs 33 and 34, the outer faces of the latter being annular but eccentric with the bore of the member 29. Collars 35 and 36 are mounted upon the said hubs and are attached thereto by set screws 37 which extend through elongated slots 38 which are formed in and which extend circumferentially of the hubs. The collars 35 and 36 co-operate with the hubs 33 and 34 to secure the inner race member and shaft against relative angular movement as described in connection with Figure 1, it being noted that in the present embodiment a collar is employed to force each of the ends of the member 29 into engagement with the shaft 32.

The collars, as in Figure 1, are employed in connection with the sealing of the open ends of the housing. To this end they are formed with annular grooves 39 which accommodate the opposite ends 40 of the housing, the co-operating faces provided by the grooves 39 and ends of the housing being portions of spheres and having the same center as that about which the shaft 32 is adjustable as it aligns itself. Secondary seals are provided by washers 41 which are arranged upon the inner member 29 between the ends of outer member 30 and the collars 35 and 36. The said washers are also adapted to take up end thrust and may be formed of any suitable bearing material or, if desired, may be replaced by suitable anti-friction thrust bearings.

In the embodiment of the invention shown in Figure 4 the housing is indicated at 42. The said housing provides a socket for race members 43 and 44, the bearing elements in this instance being of the ball type and being indicated at 45. The member 43 fits upon a shaft 46 and is formed with a hub 47, the outer face of the latter being annular but eccentric with the bore of the said member. A collar 48 fits upon the hub 47 and is attached thereto by set screws 49 which extend through an elongated slot 50, which is formed in the said hub. The collar 48 co-operates with the hub to secure the member 43 and the shaft 46 against relative angular movement as described in connection with Figure 1. The collar 48 is formed with an annular groove 51 which accommodates the open end of the housing as described in connection with Figure 2. A secondary seal is provided by a disc 53 which is arranged in the open end of the housing over the inner member 43 and against the outer member 44 but in spaced relation with respect to the collar 48.

The embodiment of the invention illustrated in Figure 5 includes an outer housing 54 which is formed to provide a socket for an inner housing 55. Two sets of rollers are indicated at 56 and 57. The races for the said sets of rollers are provided by inner and outer rings 58 and 59, respectively. The outer of the said rings are held in spaced relation by an internal rib 60 which is formed upon the inner housing 55 while the inner rings 58 fit upon a sleeve 61 which in turn fits upon the shaft 62 with which the bearing is associated. One end of the sleeve 61 is formed to provide a hub 63, the outer face of which is annular but eccentric with respect to the bore of the sleeve. A collar 64 fits over the hub 63 and is attached thereto by set screws 65 which extend through an elongated slot 66 which is formed circumferentially of the said hub. The set screws 65 are adjustable to secure the sleeve and shaft against relative angular movement as described in connection with Figure 1. Escape of the lubricating medium from or entry of dust or other foreign substances into the inner housing is prevented by the collar 64 which co-operates with rings 67 and 68 to provide a seal of the labyrinth type. It is to be noted that in the present embodiment the inner race members are not secured to the shaft but fit upon the sleeve 61 which is an independent part of the bearing. The sleeve, therefore, prevents contact between the race members and the shaft. Wearing of or injury to the said shaft as a result of relative movement between it and the race members is thus prevented.

From the foregoing it will be apparent that in each embodiment a sleeve-like member of the bearing is secured to the shaft with which the bearing is associated in such a manner as to prevent excess wearing of or injury to the bearing or shaft, this being insured even though the bearing does not fit the shaft closely. It will also be apparent that the constructions provided are simple and compact as a result of the utilization of the locking collars as sealing elements, the said collars co-operating with the associated bearing parts to maintain effective seals while permitting relative movement between the parts as they align themselves. In this connection it is to be understood that although the bearings shown in the various embodiments are of the anti-friction type this is intended to be by way of example only as the feature of the invention may be employed to equal advantage in connection with other types of bearings.

I claim as my invention:

1. A bearing of the character described including a sleeve-like member which is adapted to fit upon the shaft with which the bearing is associated, said member having a hub portion, the outer face of which is eccentric to the bore of said member, said hub portion having an elongated circumferentially arranged slot formed therein, a collar which is mounted upon said hub portion and means carried by said collar which extends through said slot to engage said shaft, said means being adjustable to cause the opposite sides of said collar and shaft to engage the thin side of said hub portion, whereby said member is prevented from moving relatively to said shaft by the wedging of said hub portion between adjacent portions of said collar and shaft.

2. A bearing of the character described including a sleeve-like member which is adapted to fit upon the shaft with which the bearing is associated, said member having a hub portion, the outer face of which is eccentric to the bore of said member, said hub portion having an elongated circumferentially arranged slot formed in its thick side, a collar which fits over said hub portion and means carried by said collar which extends through said slot to engage said shaft, said means being adjustable to cause the opposite sides of said collar and shaft to engage the thin side of said hub portion, whereby said member is prevented from moving relatively to said shaft by the wedging of said hub portion between adjacent portions of said collar and shaft.

3. A bearing of the character described including a sleeve-like member which is adapted to fit upon the shaft with which the bearing is associated, said member having a hub portion, the outer face of which is eccentric to the bore of said member, said hub portion having an elongated circumferentially arranged slot formed in its thick side, a collar which fits over said hub portion and a set screw carried by said collar which extends through said slot to engage said shaft, said set screw being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft.

4. A bearing of the character described including inner and outer members which provide a race for anti-friction elements, said inner member being adapted to fit upon the shaft with which the bearing is associated and having a hub portion, the outer face of said hub portion being eccentric to the bore of said member, said hub portion having an elongated circumferentially arranged slot formed therein, a collar which fits over said hub portion and means carried by said collar which extends through said slot to engage said shaft, said means being located in spaced relation with respect to the ends of said slot and being adjustable to cause the opposite sides of said collar and shaft to engage the thin side of said hub portion, whereby said inner member is prevented from moving relatively to said shaft by the wedging of said hub portion between adjacent portions of said collar and shaft.

5. A bearing of the character described including inner and outer members which provide a race for anti-friction elements, said inner member being adapted to fit upon the shaft with which the bearing is associated and having a hub portion, the outer face of said hub portion being eccentric to the bore of said member, said hub portion having an elongated circumferentially arranged slot formed in its thick side, a collar which fits over said hub portion and a set screw carried by said collar which extends through said slot to engage said shaft, said set screw being located in spaced relation with respect to the ends of said slot and being adjustable to cause the opposite sides of said collar and shaft to engage the thin side of said hub portion, whereby said inner member is prevented from creeping around said shaft as the latter rotates by the wedging of said hub portion between adjacent portions of said collar and shaft.

6. A bearing of the character described including a housing having an open end, a sleeve-like member in said housing which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft and means including said collar for sealing the open end of said housing.

7. A bearing of the character described including a housing having an open end, a sleeve-like member in said housing which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, said collar having an annular groove formed in its inner side, means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft and means for sealing the open end of said housing, said means including an annular element which is carried by said housing and which extends into said groove.

8. A bearing of the character described including a housing having an open end, a sleeve-like member in said housing which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, said collar having an annular groove formed in its inner side, means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft and means which extends into said annular groove to seal the open end of said housing, the co-operating faces of said last named means and grooves being portions of spheres and having the same center as that about which the said shaft aligns itself.

9. A bearing of the character described including a housing having an open end, a sleeve-like member in said housing which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, said collar having an annular groove formed in its inner side into which the open end of said housing projects to provide a seal and means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft.

10. A bearing of the character described including a housing having an open end, a sleeve-like member in said housing which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, said collar having an annular groove formed in its inner side into which the open end of said housing projects to provide a seal and means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft and an element arranged in the open end of said housing, said element extending into said groove and co-operating with said collar to seal said open end.

11. A bearing of the character described including a sleeve-like member which is adapted to fit upon the shaft with which the bearing is associated, said member having a hub portion, the outer face of which is eccentric to the bore of said member, said hub portion having an elongated circumferentially arranged slot formed therein, a collar which fits over said hub portion, means carried by said collar which extends through said slot to engage said shaft, said means being located in spaced relation with respect to the ends of said slot and being adjustable to cause the opposite sides of said collar and shaft to engage the thin side of said hub portion, whereby said member is prevented from moving relatively to said shaft by the wedging of said hub portion between adjacent portions of said collar and shaft, the co-operating sealing faces provided by the open end of said housing and said groove being portions of spheres and having the same center as that about which the said shaft aligns itself.

12. A bearing of the character described including a housing